US012707341B2

(12) United States Patent
Moussa

(10) Patent No.: US 12,707,341 B2
(45) Date of Patent: Aug. 11, 2026

(54) INTEGRATION OF PROACTIVITY IN WIRELESS NETWORKS VIA TARGETED-CONTRACTS

(71) Applicant: HUAWEI TECHNOLOGIES CO., LTD., Shenzhen (CN)

(72) Inventor: Hesham Gamal Aly Mohamed Moussa, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 430 days.

(21) Appl. No.: 18/235,512

(22) Filed: Aug. 18, 2023

(65) Prior Publication Data

US 2025/0063436 A1 Feb. 20, 2025

(51) Int. Cl.
*H04W 36/00* (2009.01)

(52) U.S. Cl.
CPC . *H04W 36/0016* (2013.01); *H04W 36/00837* (2018.08)

(58) Field of Classification Search
None
See application file for complete search history.

(56) References Cited

U.S. PATENT DOCUMENTS

2022/0030484 A1* 1/2022 Cheng ............... H04W 36/0058
2022/0046490 A1* 2/2022 Tripathi ............ H04W 36/0085
2022/0086218 A1* 3/2022 Sabella ................ H04M 15/66
2024/0397405 A1* 11/2024 Fujishiro .............. H04W 36/08

FOREIGN PATENT DOCUMENTS

KR 20250050903 A * 4/2025 ...... H04W 36/00835
WO WO-2024110945 A1 * 5/2024 ........ H04W 36/0085
WO WO-2024216589 A1 * 10/2024 ............ H04W 36/00

* cited by examiner

*Primary Examiner* — Kodzovi Acolatse

(57) ABSTRACT

Methods, apparatus, and systems for integrating proactivity into communication networks are disclosed. Predictive functions in networks can enable the networks to foresee and anticipate potential future events. However, responding proactively to such predictions has typically involved trade-offs between reliability, proactivity, and resource wastage. Embodiments of the present disclosure may resolve these trade-offs by using targeted contracts that define the proactive operations among network entities. Some embodiments may identify master and target network entities that collaborate through contracts that are specific to the network entities and potential events to provide responses unique to the situation. In some embodiments the contracts may be negotiated and updated according to more recent predictions to promote flexibility and reliability.

20 Claims, 14 Drawing Sheets

INTEGRATION OF PROACTIVITY IN WIRELESS NETWORKS VIA TARGETED-CONTRACTS

CROSS-REFERENCE TO RELATED APPLICATIONS

This is the first application filed for the present invention.

FIELD OF THE INVENTION

The present invention pertains generally to the field of communication networks and in particular to a method and apparatus for integrating proactivity in communication networks.

BACKGROUND

Basic functions of communication networks, such as 5G mobile networks, are often designed to respond reactively to network events. Such functions can involve interactions between a master network entity and one or more target network entities. Examples include handover, interference management, dynamic network slicing, and radio resource management. With reactive functions, when an event occurs, a particular protocol is triggered to reconfigure the network and commit changes so that the network can handle the effects of the event. The reactive approach inherently delays responses and can cause service interruptions in the network, which has motivated a need for more intelligent and proactive network functions.

The objective of proactivity is to prepare the network ahead of a potential event so that responses can be faster if the event occurs. By anticipating an event, the network can reduce or avoid the delays associated with the time needed for the event to happen, for the network to detect the event, and for the network to process a response to the event.

Predictive models are at the core of proactivity. These models are responsible for making predictions of potential events, from which the network can make proactive decisions. With such models, predictions become more accurate as they are made closer to the event because the likelihood of the event becomes more certain. Thus, being proactive is more reliable when predictions are made closer to the event. However, making predictions closer to the event leaves less time for making decisions and proactive preparations (i.e., it shortens the proactivity window), which diminishes the benefits of being proactive. A clear trade-off therefore exists between being reliable and being proactive. With mobile networks, which are notoriously random, this trade-off has particularly challenged proactive operation.

In addition to the trade-off between reliability and proactivity, a need for tailoring solutions to each predicted event has challenged implementations of proactivity. The range of possibilities for predicted events cannot be entirely covered by a universal proactivity setting. Each possible event requires different handling, specific to its context.

Artificial intelligence and machine learning techniques have been investigated as means for achieving intelligent and proactive networks. Such techniques have been studied in handover management, beamforming, network resource management, and other network functions. To resolve the trade-off between reliability and proactivity, these solutions resort to using inefficient strategies for achieving proactivity, such as excessively or redundantly booking resources. These approaches again limit the benefits of being proactive and introduce an additional layer of complexity to the trade-off: resource wastage. Furthermore, these solutions, which use the same proactive strategy for all situations, lack differentiation.

To overcome the reliability-proactivity trade-off, other work has proposed executing a network function partially for each of several scenarios generated by a predictive model. The approach minimizes the execution time for the scenario that actually happens while mitigating resource wastage. However, the method is not fully proactive and does not provide solutions unique to the situation, wherein each target entity can be differentiated and instructed to act a certain way. Furthermore, because the method determines the extent of proactive execution for an individual scenario using only the scenario's likelihood of happening, it neglects other factors that affect proactivity. Such factors could include whether a target network entity can release reserved resources or the length of time required for a target entity to decide on how much resources it can reserve. The method also does not permit target nodes to change their decision or involvement.

Therefore, improvements in the integration of proactivity in communication networks are needed.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide methods, apparatus, and systems for improving the integration of proactivity in communication networks.

A first aspect of the present disclosure provides a method for integrating proactivity in a network that includes a plurality of network entities (NEs). The method may be implemented by an orchestrator of the network. The method may comprise, in accordance with an initial state (IS) of a first NE of the plurality of NEs, and in accordance with a prediction that a future event will occur in the network to cause the IS of the particular NE to change to a modified state (MS) that MS belongs to one or more MSs: identifying, for each MS of the one or more MSs, a respective group of one or more NEs of the plurality of NEs that will need to perform a respective one or more actions to change the IS of the first NE to the MS. The NEs of each respective group of one or more NEs belong to the plurality of NEs. The method may also comprise classifying the identified groups of one or more NEs in accordance with pre-determined classification rules, to obtain one or more classes each having at least one classified group of NEs; and for each class of the one or more classes, for each classified group of one or more NEs of the at least one classified group of one or more NEs of the respective class, generating a respective execution contract that defines at least one criterion to be met for the one or more actions of the one or more NEs of the respective classified group of one or more NEs to be executed; and defines at least one of resources to be reserved to execute the respective one or more actions of the one or more NEs of the respective classified group, and a time at which at least one action of the respective one or more actions of the one or more NE actions are to be executed. The method may further comprise determining that the at least one criterion has been met for an individual execution contract to obtain an identified execution contract and executing the identified execution contract.

A second aspect of the present disclosure provides a method for integrating proactivity in a network that includes one or more NEs. One of the one or more NEs may be an orchestrator and may implement the method. The method may comprise: obtaining an initial prediction of a potential state of the network; identifying one or more target NEs of the one or more NEs; generating one or more contracts, each contract having one or more terms, each term defining a network action by at least one target NE to prepare the network for the potential state, the at least on target NE belonging to the one or more target NEs; executing at least one contract; and causing, when the at least one contract is executed, network actions of the one or more terms of the respective contract to begin executing by the corresponding target NEs, and one or more network resources of the corresponding target NEs to become reserved for the potential state.

In some embodiments of the second aspect, the method may further comprise: determining a number of classes; generating one or more classes according to the number of classes; and/or categorizing each of the one or more target NEs into a class of one or more classes. Categorizing each of the one or more target NEs into the class of the one or more classes may include using a target classifier function. In some embodiments, generating the one or more contracts may include generating for each class a general contract and individualizing each general contract according to the target NEs of the corresponding class. Generating for each class the general contract may include retrieving one or more terms from a pool of terms, and/or using a general contract generator function. Individualizing each general contract according to the target NEs of the corresponding class may include using an individualized contract generator function. In some embodiments, each class may correspond to a priority level.

In some embodiments of the second aspect, the method may further comprise: detecting the trigger event in the network where the trigger event is a change in a network parameter that meets a threshold value; and/or collecting data associated with the trigger event. In some embodiments, obtaining the initial prediction of the potential state of the network may be done when the trigger event is detected.

In some embodiments of the second aspect, obtaining the initial prediction of the potential state of the network may include predicting a potential state of the network and/or using a prediction module. In some embodiments, the method may further comprise obtaining one or more additional predictions for at least one additional potential state of the network, each of the at least one additional potential state being an alternative to the potential state. In these embodiments, each term of the one or more contracts may define a network action by at least one target NE for the potential state or for the at least one additional potential state, and one or more network resources of at least one corresponding target NE may become each reserved for the potential state or for one additional potential state.

In some embodiments of the second aspect, the method may further comprise sending to each target NE the respective contract. In some embodiments, one term of the one or more contracts may define a respective hardening condition for finalizing the respective contract. Each hardening condition may depend from a probability of the potential state or a time duration. In some embodiments, the method may further comprise negotiating with at least one target NE at least one term of a respective contract. In some embodiments, the method may further comprise obtaining a second prediction of the potential state, the second prediction obtained after the initial prediction. The second prediction may be sent to at least one target NE. In some embodiments, the method may further comprise receiving from the one or more target NEs each an agreement to the respective contract.

In some embodiments of the second aspect, the method may further comprise sending to the one or more target NEs each a template hard contract defining one or more template hard contract terms. Each template hard contract term may define another network action by at least one target NE for immediate execution.

In some embodiments of the second aspect, the orchestrator may be a user equipment, a radio base station such as a gNodeB, or a network slice orchestrator. In some embodiments, each target NE may be a different radio base station or a network equipment belonging to one or more network slices. In some embodiments, the network may be a communication network such as a 5G cellular network.

A third aspect of the present disclosure provides a communication network comprising an orchestrator and a plurality of NEs, wherein the orchestrator is configured to implement the method of the first aspect.

A fourth aspect of the present disclosure provides a communication network comprising one or more NEs, wherein at least one of the one or more NEs is an orchestrator configured to implement the method of the second aspect. Some embodiments of the fourth aspect may further provide the embodied variations of the second aspect.

A fifth aspect of the present disclosure provides an electronic device comprising a processor coupled to tangible, non-transitory processor-readable memory, the memory having stored thereon instructions to be executed by the processor to implement the method of the first aspect. The electronic device of the fifth aspect may be an apparatus, a component, or a module in a device.

A sixth aspect of the present disclosure provides a non-transitory processor-readable memory having stored thereon instructions to be executed by a processor to implement the method of the first aspect.

A seventh aspect of the present disclosure provides a computer program comprising instructions to be executed by a computer to implement the method of the first aspect.

An eighth aspect of the present disclosure provides an electronic device comprising a processor coupled to tangible, non-transitory processor-readable memory, the memory having stored thereon instructions to be executed by the processor to implement the method of the second aspect. Some embodiments of the eighth aspect may further provide the embodied variations of the second aspect. The electronic device of the eighth aspect may be an apparatus, a component, or a module in a device.

A ninth aspect of the present disclosure provides a non-transitory processor-readable memory having stored thereon instructions to be executed by a processor to implement the method of the second aspect. Some embodiments of the ninth aspect may further provide the embodied variations of the second aspect.

A tenth aspect of the present disclosure provides a computer program comprising instructions to be executed by a computer to implement the method of the second aspect. Some embodiments of the tenth aspect may further provide the embodied variations of the second aspect.

Embodiments have been described above in conjunction with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

To improve the integration of proactivity in communication networks, embodiments of the present disclosure are generally directed towards generating contracts that define network actions among network entities in anticipation of predicted future events. Some embodiments may generate a customized contract for each network entity. To improve the reliability of proactive operation, in some further embodiments, the network entities may negotiate the contracts as the likelihood of the predicted event becomes more certain or as the event approaches and new information on the state of the network becomes available.

The present disclosure sets forth various embodiments via the use of block diagrams, flowcharts, and examples. Insofar as such block diagrams, flowcharts, and examples contain one or more functions and/or operations, it will be understood by a person skilled in the art that each function and/or operation within such block diagrams, flowcharts, and examples can be implemented, individually or collectively, by a wide range of hardware, software, firmware, or combinations thereof. The terms in each of the following sets may be used interchangeably throughout the disclosure: "master network entity" and "orchestrator"; "network action" and "network interaction"; "node" and "network entity", "term" and "clause", "predicted event" and "forthcoming event"; and "targeted contract" and "execution contract".

Figure 1:
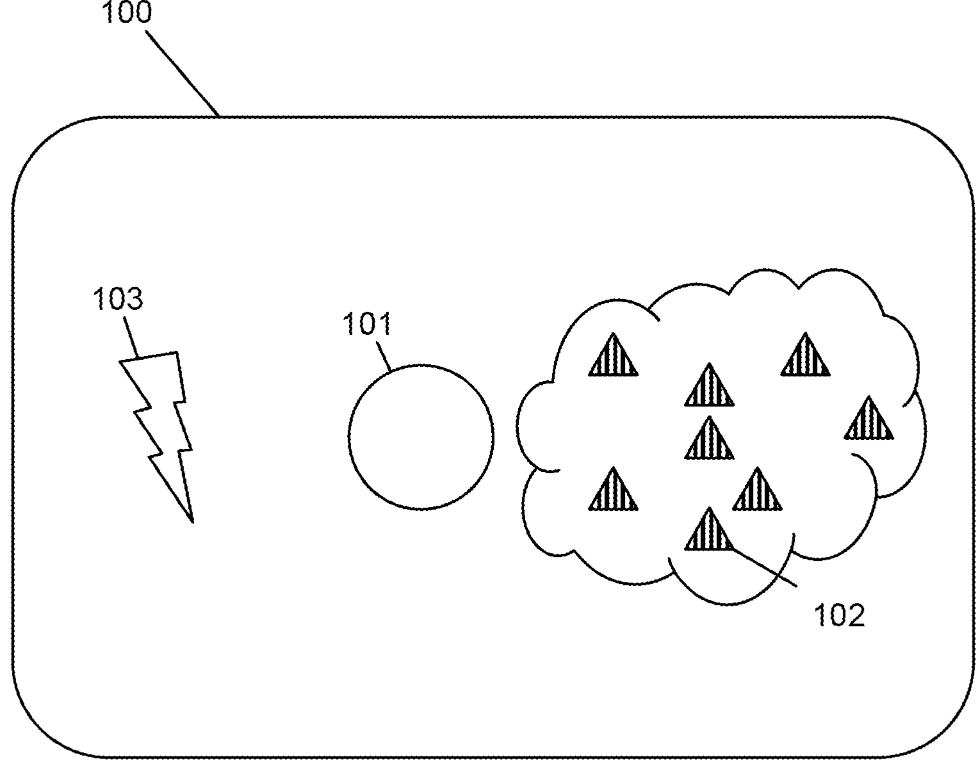
FIG. 1 shows a reactive network operation, according to a method typical of the prior art.

FIG. 1 shows a typical reactive network operation 100 according to methods of the prior art. Here, a master network entity (NE) 101 collaborates with one or more other, target NEs 102 to respond to an event 103 in a communication network. The NEs 102 may be any functional element of a communication network, including, for example, user equipment such as mobile phones or internet-of-things devices, radio base stations such as gNodeBs, core network functions, and satellites. The master NE 101 and target NEs 102 may each be any one of such NEs. The master NE 101 may be an NE that decides how to handle the event 103, whereas the target NEs 102 may be other NEs that interact with the master NE 101 in handling the event 103. The master NE 101 may further be referred to as an orchestrator. The communication network that the NEs 101 and 102 belong to may be a wired or wireless network or may combine wired and wireless components, and the network may include any combination of NEs. The communication network may, for example, be an LTE, 4G or 5G cellular network, a Wi-Fi network, a datacenter, a core network, or a satellite network. The event 103 may be a change in the initial state of a NE or the network towards a modified state that may require a change in the provisioning of network resources through, for example, a handover, radio resource management, interference management, or dynamic network slicing. In a reactive network operation 100, the event 103, once it occurs, will trigger a particular protocol from the master NE 101 to configure the target NEs 102, and possibly the master NE 101 itself, and commit changes in the network to handle the event 103. For example, an event 103 could be a user equipment requesting to establish a connection to transmit data in an uplink direction, which could trigger a beamforming base station to react by assigning a beam to the user equipment for the transmission. By being reactive, responses from the network are inherently delayed.

Figure 2A:
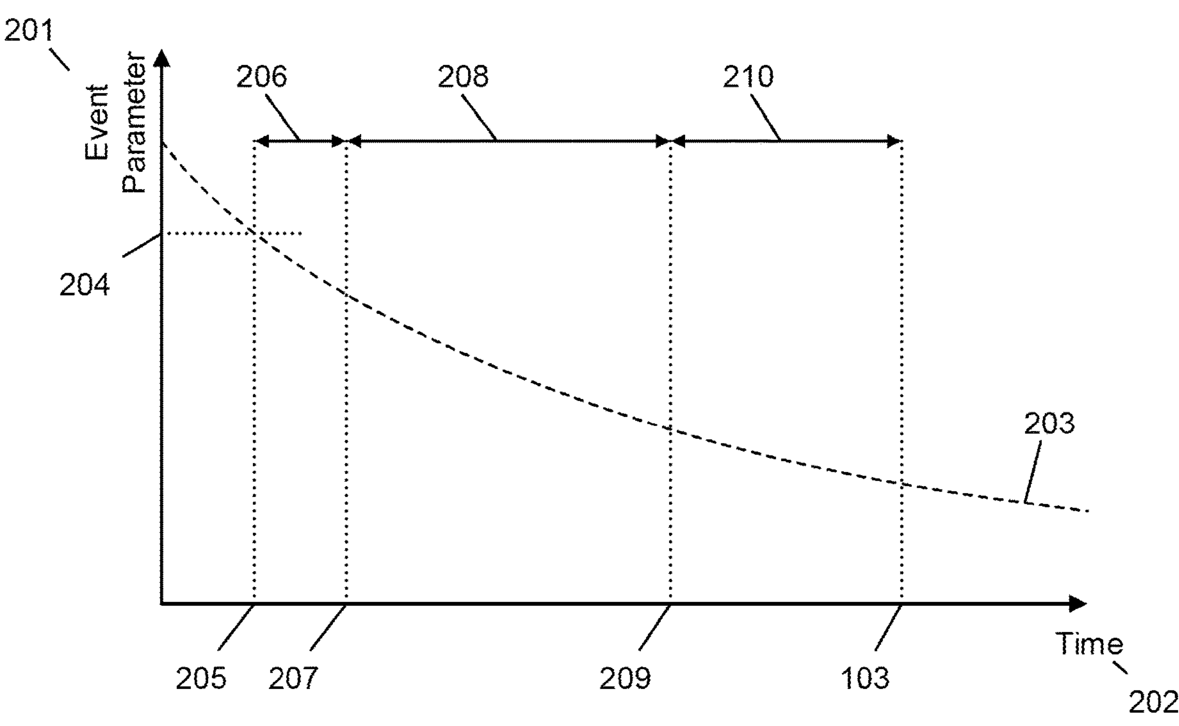
FIG. 2A shows stages of proactive operation on a graph of a network parameter evolving with time, according to a method typical of the prior art.

To minimize or eliminate delays in responding to events 103, a network may operate proactively. Proactive operation involves predicting an event 103, taking decisions to respond to the event 103, and implementing the decisions before the event 103 occurs. FIG. 2A shows stages of proactive operation according to methods typical of the prior art. Referring to FIGS. 1 and 2A, according to these methods, predicting an event 103 may begin with monitoring parameters 201 of the network over time 202 for trends 203 that might indicate a forthcoming event 103 (or the "predicted event"). Network parameters 201 may include, for example, the position and movement of NEs, utilization of network resources, sensor data, network channel bandwidths, transmission rates in the network, or analytics data. When a trend 203 for a particular parameter 201 reaches a threshold 204 (or "threshold value"), it may trigger 205 proactive network operations. These operations may begin with a first phase of data collection 206 to obtain an initial prediction 207 of the event 103. The initial prediction 207 may provide information on the significance of the trigger 205 and a future potential state of the network associated with the event 103. The initial prediction 207 may occur far ahead of the predicted event 103 and so may be inaccurate. If the trigger 205 is determined to be significant, a second phase 208 of data collection and prediction may begin to improve the accuracy of the initial prediction 207. At the end of this second phase 208, a final prediction 209 may be generated, which may be more accurate than the initial prediction 207. The final prediction 209 may be used by a master NE 101 to determine how to proactively handle the predicted event 103, possibly in collaboration with one or more target NEs 102. The time between when the final prediction 209 is made and when the predicted event 103 actually occurs may be known as the proactivity window 210. During the proactivity window 210, the master NE 101 may make decisions, possibly with target NEs 102, on processes that should be executed in response to the predicted event 103 or in preparation for it.

In proactive network operation, the size of the proactivity window 210 may determine how proactive and reliable the network can be. Lengthening the proactivity window 210 enables the network to be more proactive and prepared for the predicted event 103, while narrowing the proactivity window 210 enables the network to generate more certain predictions and respond more reliably. Thus, there is a trade-off between proactivity and reliability.

Figure 2B:
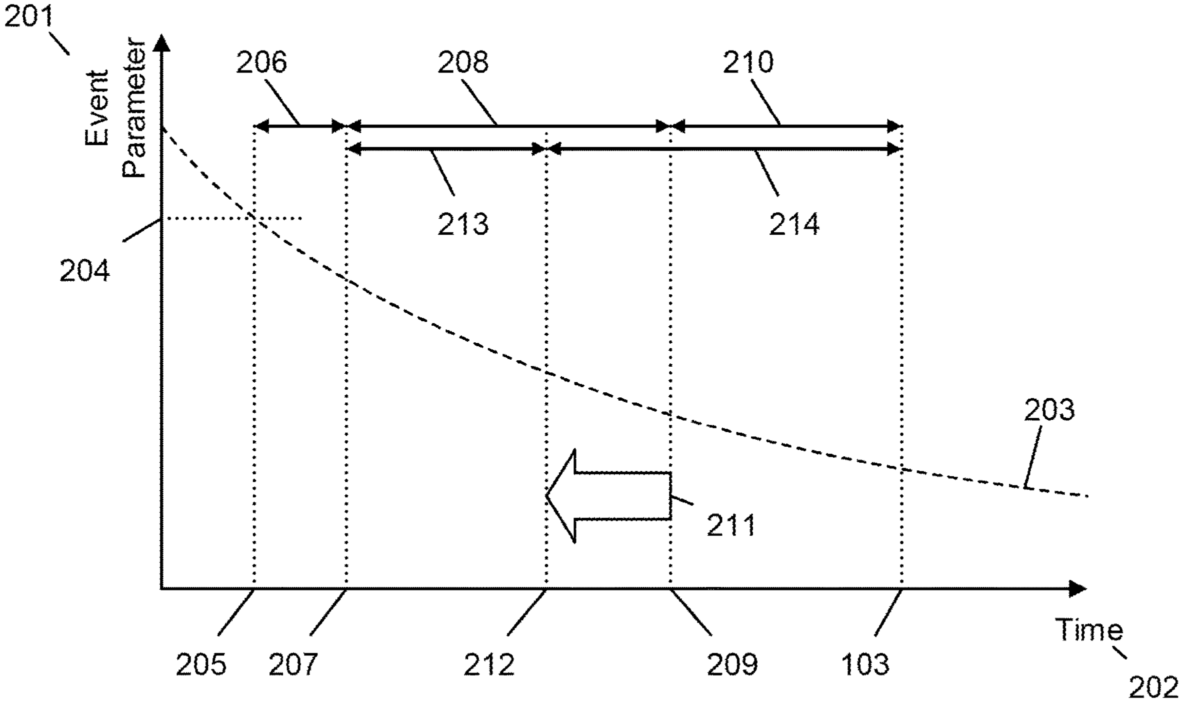
FIG. 2B shows the effects of resource over-provisioning to improve proactive operation, according to a method typical of the prior art.

To lengthen the proactivity window 210 while maintaining reliability, some methods of the prior art may excessively or redundantly reserve network resources ahead of the predicted event 103. FIG. 2B shows an example of lengthening 211 the proactivity window 210, according to the methods for proactive operation of FIG. 2A. By making the final prediction 209 at an earlier time 212, the second phase 208 of data collection may shorten to a narrower time window 213 while the proactivity window 210 may lengthen to a longer time window 214. In such a case, without provisioning additional network resources during proactive network operations, the reliability of the network may decrease. The trade-off between proactivity and reliability may therefore extend to resource wastage.

Embodiments of the present disclosure may resolve the trade-offs of the prior art between proactivity, reliability, and resource wastage. To resolve the trade-offs, methods of the present disclosure may involve generating targeted contracts (or "execution contracts") between NEs with agreed upon terms for handling a predicted event 103. By being targeted, the contracts may define terms that are unique and specific to each NE and to the particular situation. For example, a targeted contract may be configured according to the operational history of a respective NE. The terms in the contracts may define actions of the respective NEs ("network actions") to meet certain obligations, procedures, and interactions towards proactively handling the change from an initial state to a modified state, as caused by the predicted event 103. This proactivity may include reserving network resources in anticipation of the predicted event 103. The terms may have criteria for executing the associated actions and may define times at which the actions may be executed. The methods may further involve negotiating the contracts as the prediction of the event 103 evolves with time 202.

Figure 3:
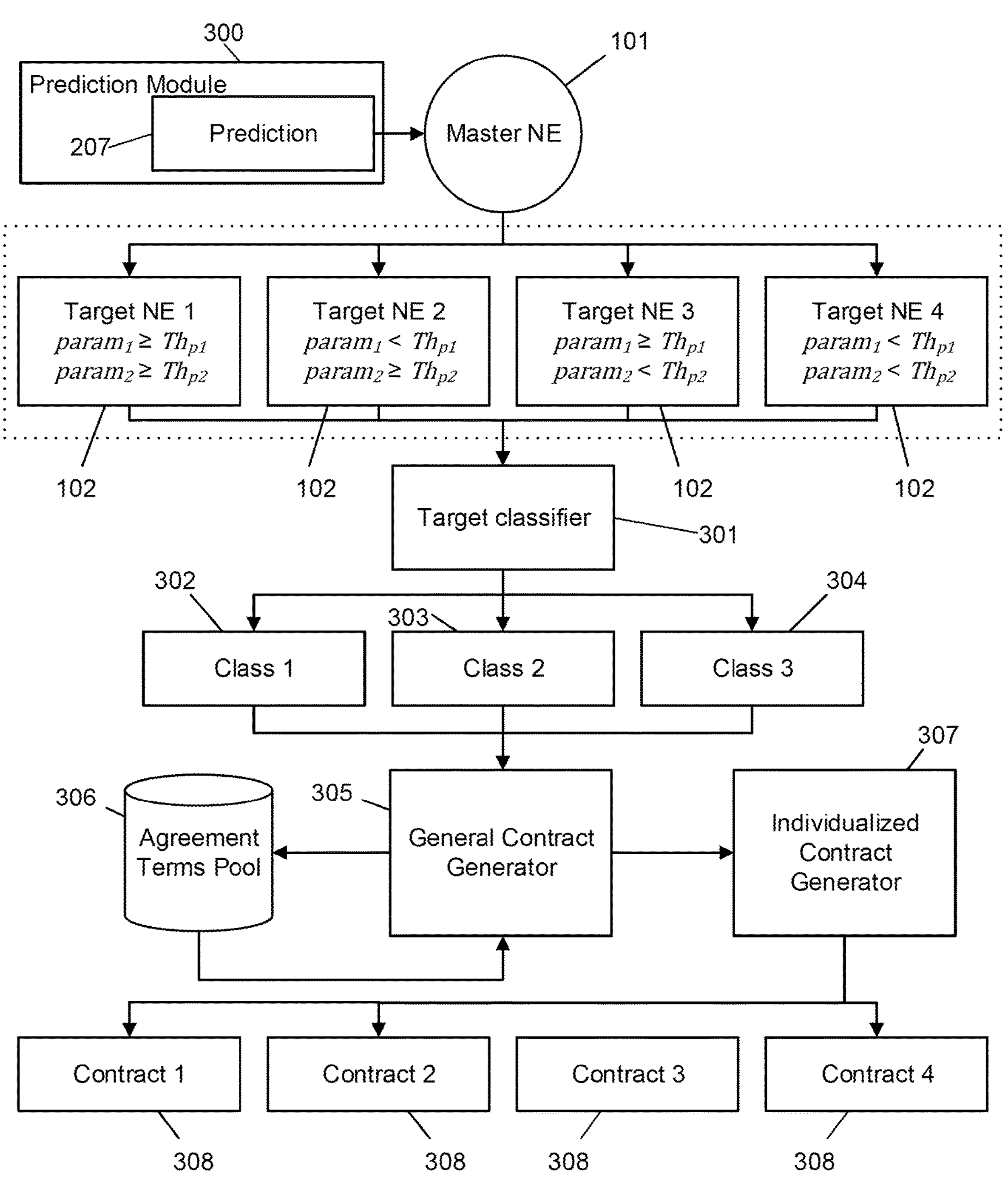
FIG. 3 shows a flowchart of a method for proactive contract generation, according to an embodiment of the present disclosure.

FIG. 3 shows a flow of data between network elements and functional network components for generating targeted contracts according to embodiments of the present disclosure. As discussed in relation to FIGS. 2A and 2B, an initial prediction 207 of a forthcoming event 103 may be generated when triggered 205 by a network parameter 201 reaching a predetermined threshold 204 or criterion. The initial prediction 207 may be generated by a prediction module 300 (which is an example of a functional network component) that is executed by a master NE 101, or by another NE, such as a core NE, and obtained by the master NE 101. The prediction module 300 may be a Network Data Analytics Function (NWDAF) or a Management Data Analytics (MDA) service or another data analytics and intelligence function. Once the master NE 101 has the initial prediction 207, it may identify one or more target NEs 102 (e.g., Target NEs 1 to 4 in FIG. 3) that it will collaborate with in proactively handling the predicted event 103. Each target NE 102 may have associated with it one or more parameters (e.g., $param_1$ and $param_2$ in FIG. 3). These parameters may in turn have associated thresholds (e.g., $Th_{p1}$ and $Th_{p2}$ in FIG. 3) that may define the state of the respective target NE 102.

The master NE 101 may communicate information about the initial prediction 207 and the target NEs 102 to a target classifier 301. The target classifier (TC) 301 may be a function (functional network component) or module located at the master NE 101 or at another NE, such as a core NE. The information communicated to the TC 301 may include, for example, the master NE's planned proactivity window, the time before proactive decisions need to be made, the resources available at target NEs 102, and the parameters and thresholds of the target NEs 102. In response to receiving the information from the master NE 101, the TC 301 may generate one or more classes (e.g., Classes 1, 2, and 3 with references 302, 303, and 304 respectively) into which the target NEs 102 can be classified according to classification criteria (features or operations). The TC 301 may then classify the target NEs 102 accordingly. The target NEs 102 may be classified according to classification rules that are pre-determined or that are generated dynamically in response to the specific situation and the initial prediction 207. In the latter case, the classification rules may, for example, be generated by a form of artificial intelligence or optimization methods. The classification rules may further designate levels of priority for the target NEs 102.

The classes generated by the TC 301 may then be shared with a general contract generator (GCG) 305, which may be a function or module located at the master NE 101 or at another NE, such as a core NE. The GCG 305 may retrieve terms for the contracts from a pre-determined pool of agreement terms 306 to generate a general contract for each class. The terms may be selected for their relation to the specific initial prediction 207 and situation. The GCG 305 may customize the selected terms of each general contract according to the specifics of the corresponding class.

The general contracts may then be sent to an individualized contract generator (ICG) 307 for customizing each general contract to the target NEs 102 of the respective class. The ICG 307 may be a function or module located at the master NE 101 or at another NE, such as a core NE. The ICG 307 may customize the contract terms using information on the features and operations unique to each target NE 102 and their relation to the specific initial prediction 207 and situation. By customizing the general contracts to each target NE 102, the roles and commitments of each target NE 102 in proactively handling the predicted event 103 can be differentiated. The output of the ICG 307 may be an individualized contract 308 (e.g., Contracts 1 to 4 in FIG. 3) for each target NE 102.

Figure 4A:
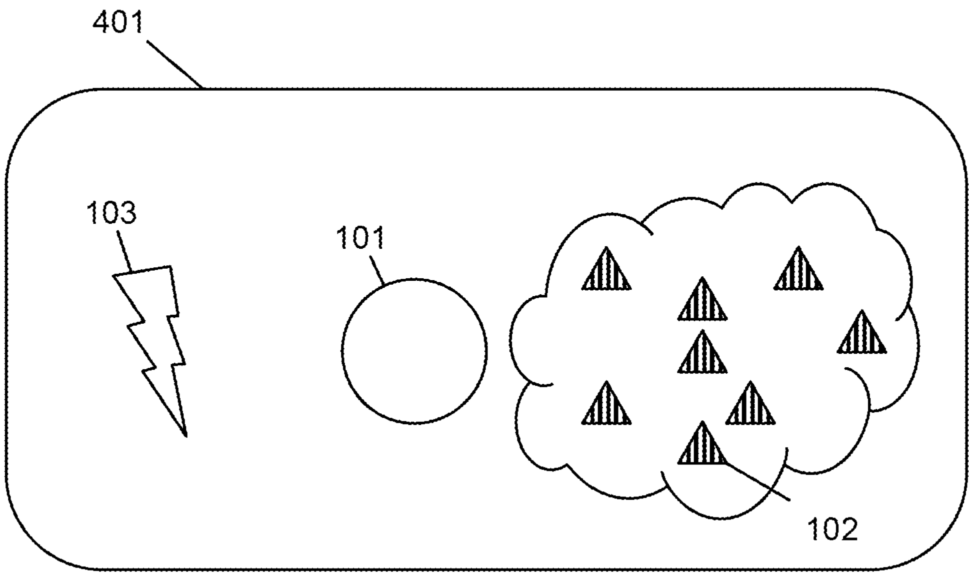
FIG. 4A shows the initial state of a network after a trigger event, according to an embodiment of the present disclosure.
Figure 4B:
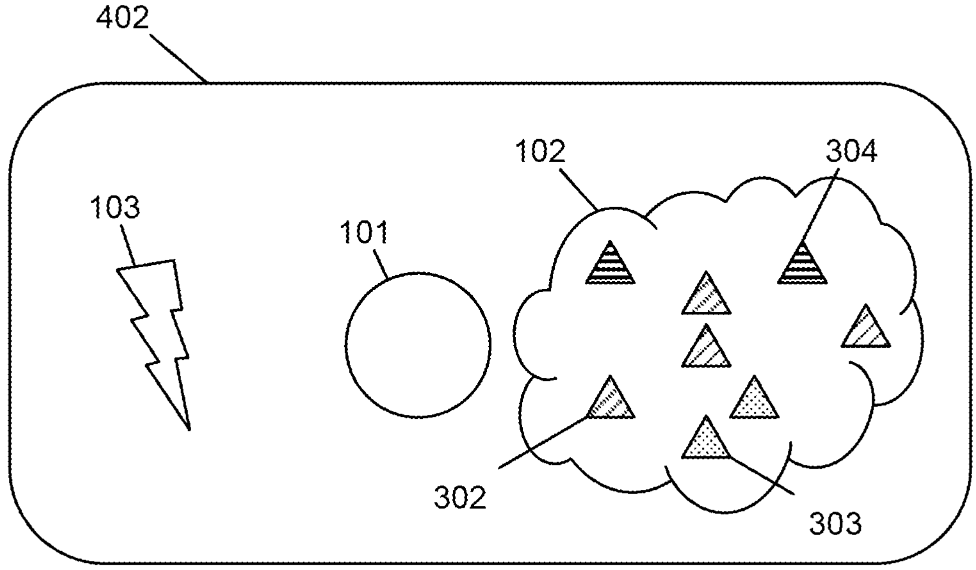
FIG. 4B shows the final state of a network after proactive operation, according to an embodiment of the present disclosure.

FIG. 4A shows the initial state 401 of a master NE 101 and a plurality of target NEs 102 once a trigger for a predicted event 103 is detected (i.e., a "trigger event" occurs) but before the predicted event 103 happens, in accordance with the method described in relation to FIG. 3. FIG. 4B shows the final state 402 of the master NE 101 and the plurality of target NEs 102 after contract generation has been completed, in accordance with the method described in relation to FIG. 3. In the final state 402, the target NEs 102 have been categorized into Classes 1, 2, and 3, corresponding to the patterning indicated at references 302, 303, and 304, respectively.

Figure 5:
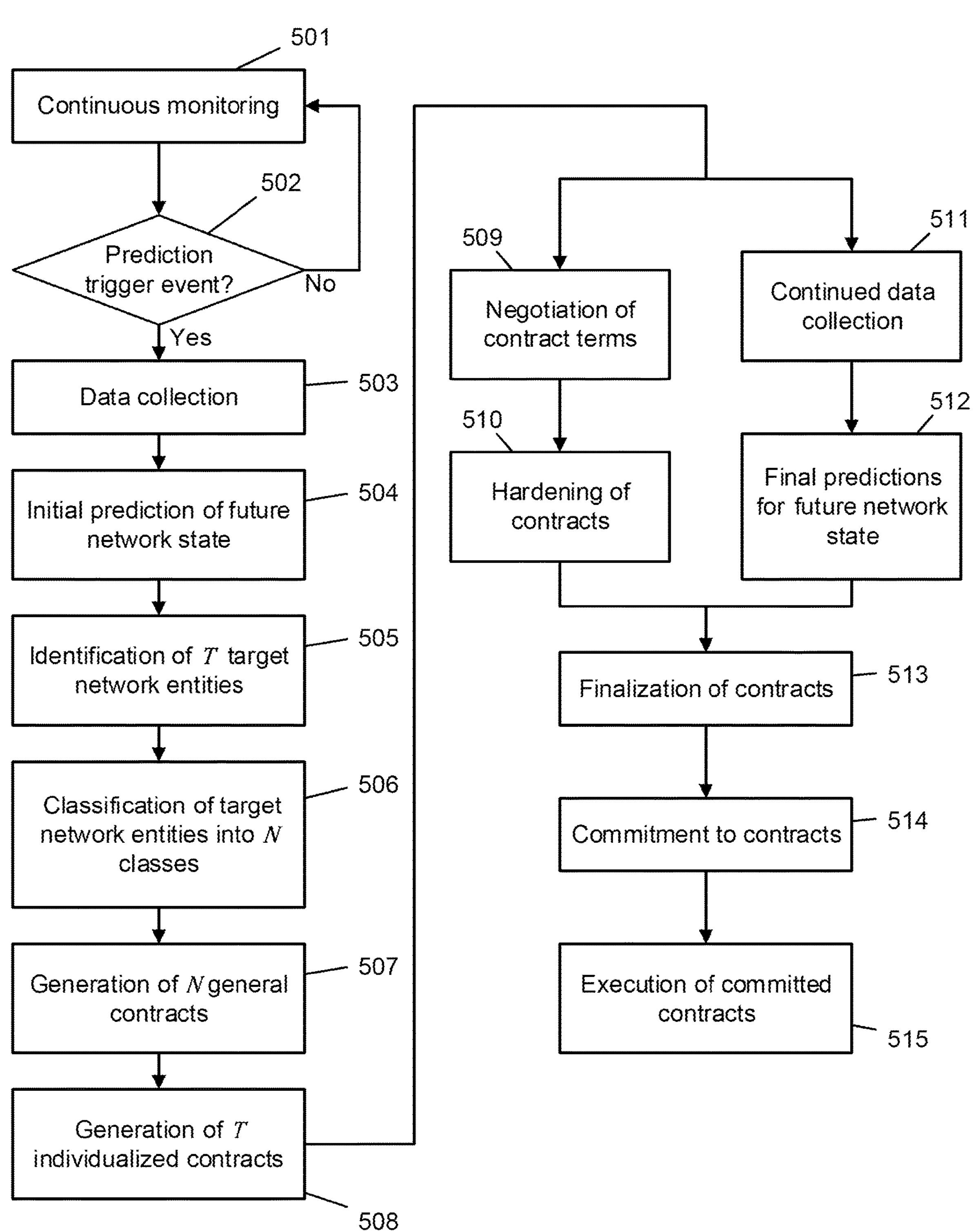
FIG. 5 shows a flowchart of a method for proactive network operation, according to an embodiment of the present disclosure.

FIG. 5 shows a flowchart of a method for generating and negotiating targeted contracts according to embodiments of the present disclosure. Actions 501 to 508 may be analogous to the actions discussed in relation to FIG. 3 for targeted contract generation. At actions 501 and 502, continuous monitoring may be done to detect an event, such as a network parameter 201 reaching a predetermined threshold 204, that may trigger a need for a prediction. Once a trigger 205 has been detected, data on the trigger may be collected, at action 503, to inform contract generation. Data collection may include, for example, gathering information on the positions and movements of NEs, utilization of network resources, sensor data, network channel bandwidths, transmission rates in the network, or analytics data. An initial prediction 207 for a forthcoming event 103 corresponding to the trigger 205 may then be generated, at action 504. The initial prediction 207 may be obtained by or generated at a master NE 101. Once the master NE 101 has the initial prediction 207, T target NEs 102 may be identified, at action 505, for the master NE 101 to collaborate with in proactively handling the predicted event 103, with T being a positive integer. At action 506, a TC 301 may classify the T target NEs 102 into N classes, with N being a positive integer less than or equal to T. The N classes may then be shared with a GCG 305 to generate, at action 507, N general contracts corresponding to the N classes. These N general contracts may then be shared with an ICG 307 to customize the N general contracts to the target NEs 102 of the respective classes, thereby producing T individualized contracts 308.

After the individualized contracts 308 have been created and before they are agreed upon, the master NE 101 and target NEs 102 may negotiate the terms of the contracts. Contract negotiation may be based on the current terms of the individualized contracts 308, the initial prediction 207, and new data collected by the master NE 101 and/or the target NEs 102. At action 509, contract negotiation may begin. The individualized contracts 308 may be shared with the target NEs 102, which may then negotiate particular clauses or terms with the master NE 101. The time window for contract negotiation may vary among the different classes. For example, high priority classes may have a shorter time window for contract negotiation than low priority classes. As the contracts are negotiated, some terms may become finalized, or "hardened", at action 510. The individualized contracts 308 may start with terms of varying hardness: if any of the contract terms can be negotiated, the contract may be considered "soft"; if only a portion of the contract terms can be negotiated, the contract may be considered "semi-hard"; and if none of the contract terms can be negotiated, the contract may be considered "hard".

During contract negotiation, data may continue to be collected, at action 511. Data may be collected by the master NE 101 and/or the target NEs 102. With the data collection, the initial prediction 207 may be continuously updated to reflect the new data. These updates may be shared among the involved NEs and may cause the contracts, or particular terms thereof, to harden or soften. Updates may include, for example, new predictions for a probability of the predicted event 103. Each NE and contract may harden independently of the other NEs and contracts. Contract negotiations, data collection, and hardening of the contracts may conclude at an agreed upon condition (or "criterion") between the NEs, at which time a final prediction 209 for the forthcoming event 103 may be generated, at action 512, for final hardening of the contracts and the terms thereof, at action 513. The hardening condition may depend, for example, on a probability of the predicted event 103 reaching a particular value or a duration of time elapsing. The hardening condition may be sent from the master NE 101 to the target NEs 102 with the individualized contracts 308. Hardening of the contracts may be determined by the target NEs 102 and may be determined in response to updates sent from the master NE 101. With the final prediction 209 and contracts, the NEs may each be required to decide whether they can commit to their respective contracts, at action 514. Once the contracts are agreed to by the NEs, they may no longer be able to change their decisions and may be committed to the contract terms until the predicted event 103 happens. At action 515, the contracts that have been committed to may be executed by the agreeing NEs to proactively prepare the network for the predicted event 103.

In some embodiments, a template hard contract or an identifier for a template hard contract may be sent to each target NE 102 with the individualized contracts 308. The template hard contract may have terms ("template hard contract terms") that have been previously agreed upon between the master NE 101 and the respective target NE 102 and that are intended for immediate execution by the target NE 102. The template hard contract may be generalized for all target NEs 102 or may be customized for each respective target NE 102. The template hard contract may be stored at the target NEs until a hardening condition is met, at which point the respective target NE may immediately execute the template hard contract. The target NE 102 may assess whether a hardening condition has been met in response to updates sent from the master NE 101 during the continued data collection of action 511. Alternatively, if a template hard contract identifier has been sent to each target NE 102, the master NE 101 may make predictions of whether a hardening condition has been met for a target NE 102 during the continued data collection of action 511. The master NE 101 may then send the template hard contract to the target NE 102 for immediate execution when the hardening condition is predicted to have been met. The target NE 102 may verify the hardening condition, acknowledge receipt of the template hard contract, and immediately execute the template hard contract. In some embodiments, the master NE 101 may not share the hardening condition with the target NEs 102. In these cases, the master NE 101 may independently determine whether the hardening condition has been met and may then trigger a template hard contract to be executed by the target NEs 102. The trigger may be a predetermined message sent to the target NEs 102 from the master NE 101, which may further include the template hard contract.

Figure 6:
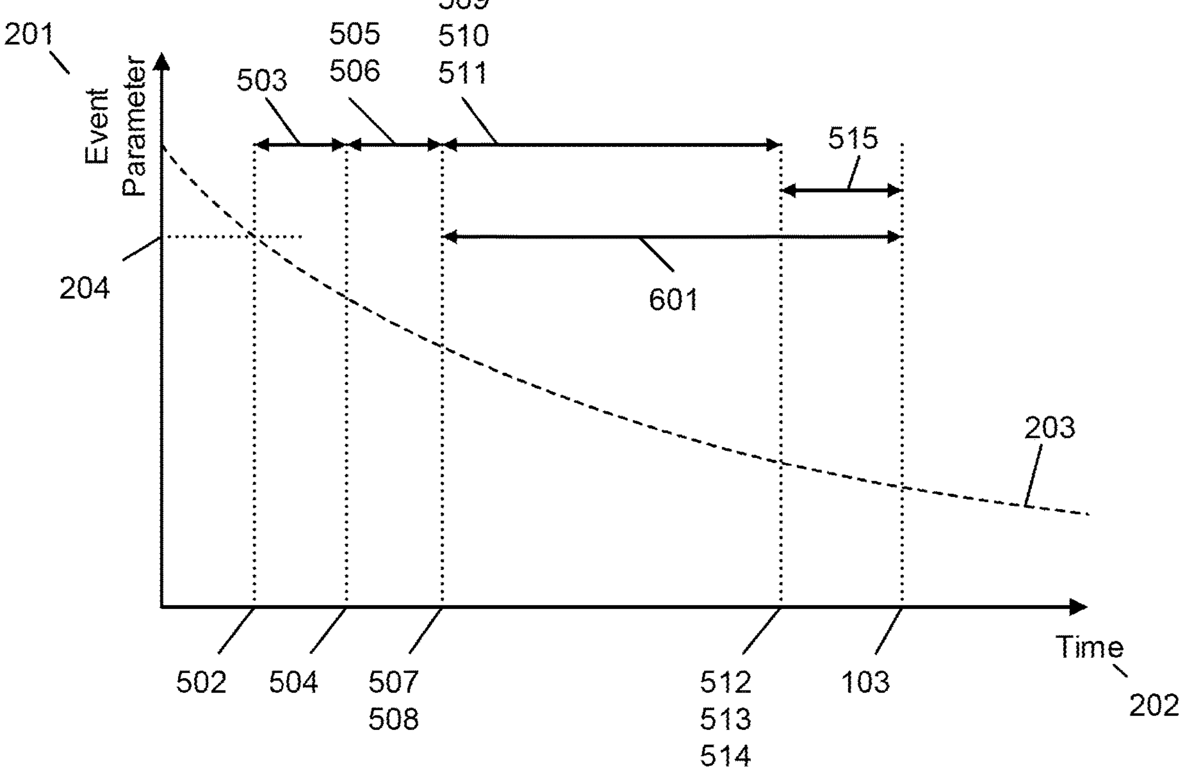
FIG. 6 shows stages of proactive operation on a graph of a network parameter evolving with time, according to an embodiment of the present disclosure.

FIG. 6 shows stages of proactive operation according to the methods discussed in relation to FIG. 5. When a trend (value) 203 in a network parameter 201 reaches a threshold 204, it may trigger proactive network operations in anticipation of a forthcoming event 103, per action 502 of FIG. 5. These operations may begin with data collection, per action 503 of FIG. 5, to obtain an initial prediction 207 of the forthcoming event 103, per action 504 of FIG. 5. Target NEs 102 may then be identified and classified, per actions 505 and 506 of FIG. 5, and individualized contracts 308 may be produced, per actions 507 and 508 of FIG. 5. Contract negotiation, further data collection, and hardening of contracts and terms thereof may proceed, per actions 509 to 511 of FIG. 5, until a final prediction 209 is generated and the NEs make decisions towards their respective contracts. Following this, committed contracts may be executed, per action 515 of FIG. 5. The time remaining for this last action before the event 103 happens may be considered as a hard proactivity window. The time spanning contract generation to the event 103 may be considered as a soft proactivity window 601.

Figure 7:
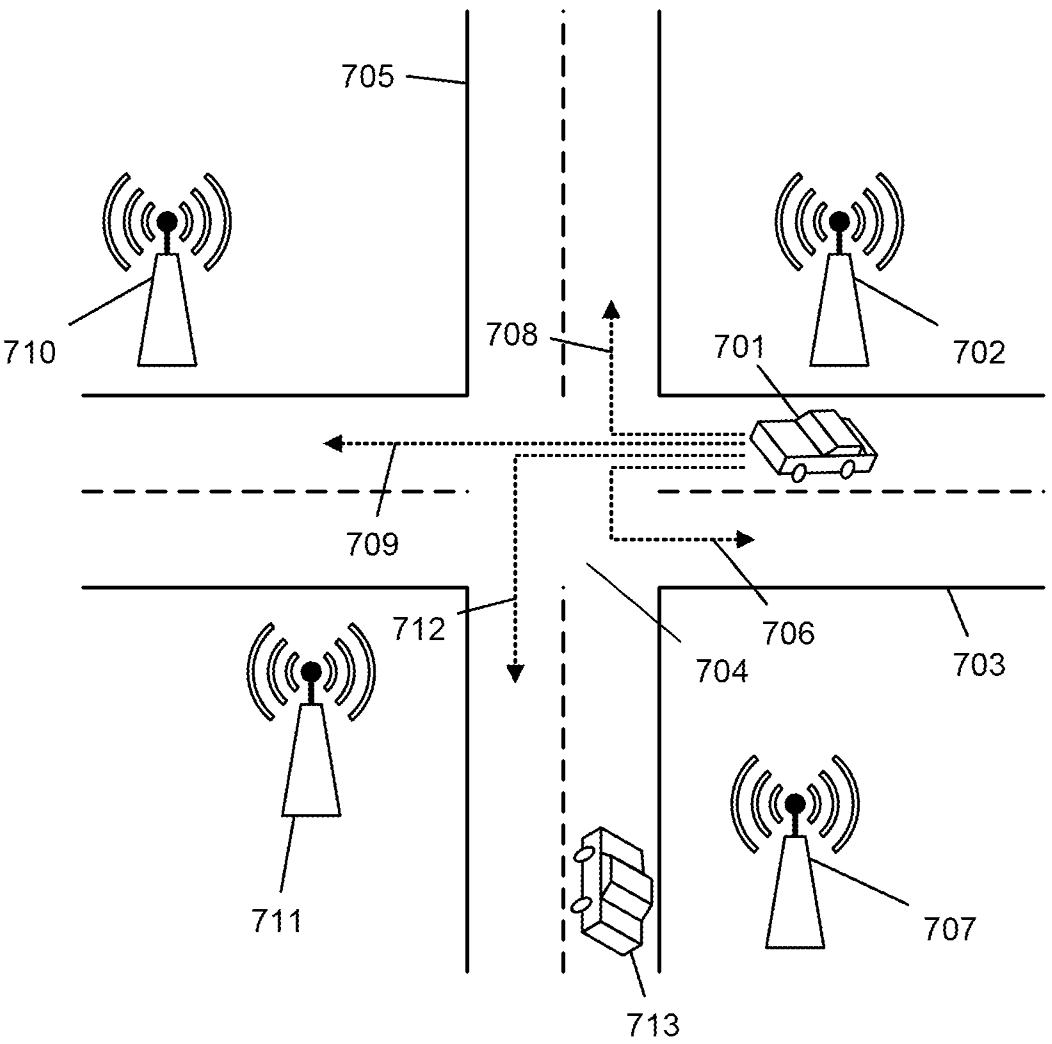
FIG. 7 shows a typical handover scenario, where embodiments of the present disclosure may be implemented.

FIG. 7 shows a non-limiting example of a handover (HO) scenario for which the methods of the present disclosure may be implemented. A first car 701 with a user equipment (UE) is receiving network service from a gNodeB 702 (i.e., the source gNodeB or s-gNB) as it drives along a road 703. As the first car 701 approaches an intersection 704 with another road 705, four options to continue receiving network service become available to the first car 701, some of which might require a HO for the UE of the first car 701 to continue receiving network service. As a first option, the first car 701 can turn around at the intersection 704 according to path 706. To continue receiving service along this path, the UE of the first car 701 can stay with gNodeB 702 or switch to gNodeB 707. As a second option, the first car 701 may turn right according to path 708 and its UE can continue receiving service from gNodeB 702. As a third option, the first car 701 can continue straight through the intersection according to path 709 and its UE can switch to gNodeB 710 or gNodeB 711. Lastly, as a fourth option, the first car 701 can turn left according to path 712 and its UE can switch to gNodeB 711. Thus, there is the possibility for four different HO events for the UE of the first car 701, each resulting in a different potential state for the network. A second car 713 with a UE is also approaching the intersection 704. The second car 713, driving along road 705, may also need network service as well and affect resource provision to the first car 713.

Figure 8:
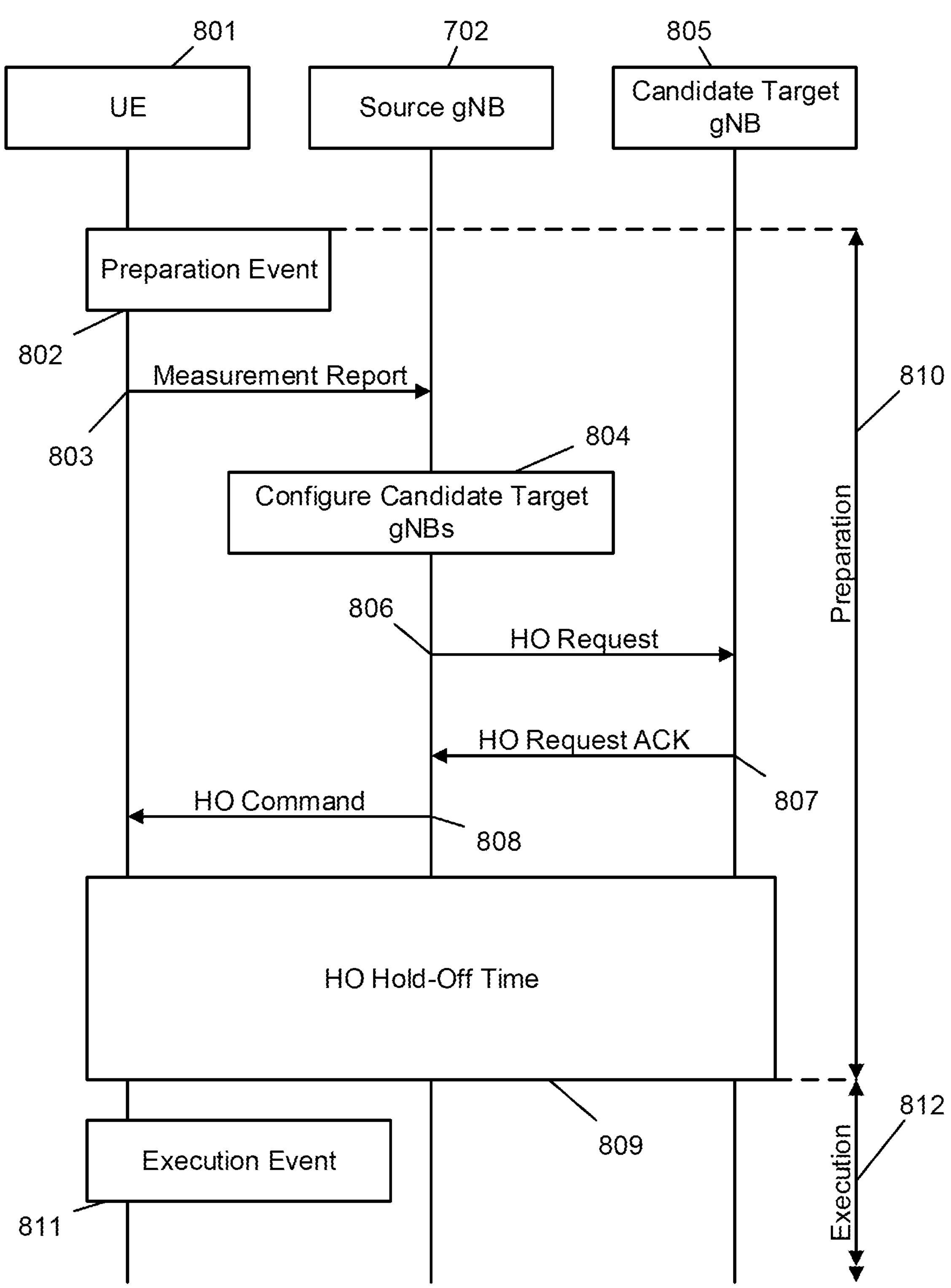
FIG. 8 shows a procedure for conditional handover, according to a method typical of the prior art.

If the UE of the first car 701 and gNodeBs were to operate according to methods typical of the prior art, they might follow a conditional HO procedure, as shown in FIG. 8. Here, the UE 801 of the first car 701 may go through a preparation event 802 in which the UE 801 performs measurements to collect data and prepares a measurement report 803 that it sends to the s-gNB 702. The s-gNB 702 may serve as a master NE 101 in this context. Once the s-gNB 702 receives the measurement report 803, it may configure 804 one or more candidate target gNodeBs (t-gNBs) 805 that the UE 801 might request a HO to (e.g., gNodeBs 707, 710, or 711). The s-gNB 702 may send a HO request 806 to the list of t-gNBs 805, which may then each perform an admission control process or other process to decide if they can provide service to the UE 801. The t-gNBs 805 that decide they can provide service may respond to the s-gNB 702 with a HO request acknowledgement message (HO Request ACK) 807. A list of t-gNBs 805 that can provide service to the UE 801 may then be sent along with HO conditions to the UE 801 in a HO command message 808. The HO conditions may refer to parameters unique to each t-gNB 805 that have criteria that determine whether the UE 801 can initiate a HO to the respective t-gNB 805. From here a hold-off period 809 for HO may begin. The actions hereto in the conditional HO procedure may be considered a preparation phase 810. The hold-off period 809 and preparation phase 810 may end once the execution event 811 happens (e.g., the first car 701 reaches the intersection 704 and decides upon a path) and the appropriate HO initiates through an execution phase 812.

With the method of FIG. 8, each t-gNB 805 that decides they can provide service to the UE 801 through a HO must reserve resources in the hold-off period 809 to be able to accommodate the potential HO. These resources can only be released once the execution event 811 happens and it can be determined that they are not needed. Because the UE 801 will only need service from one t-gNB 805, this method results in an over-provisioning and wastage of resources. For example, the resources reserved by the UE 801 may be unavailable to a UE associated with the second car 713 until the execution event for the UE 801, regardless of whether the resources are eventually used by the UE 801.

Figure 9:
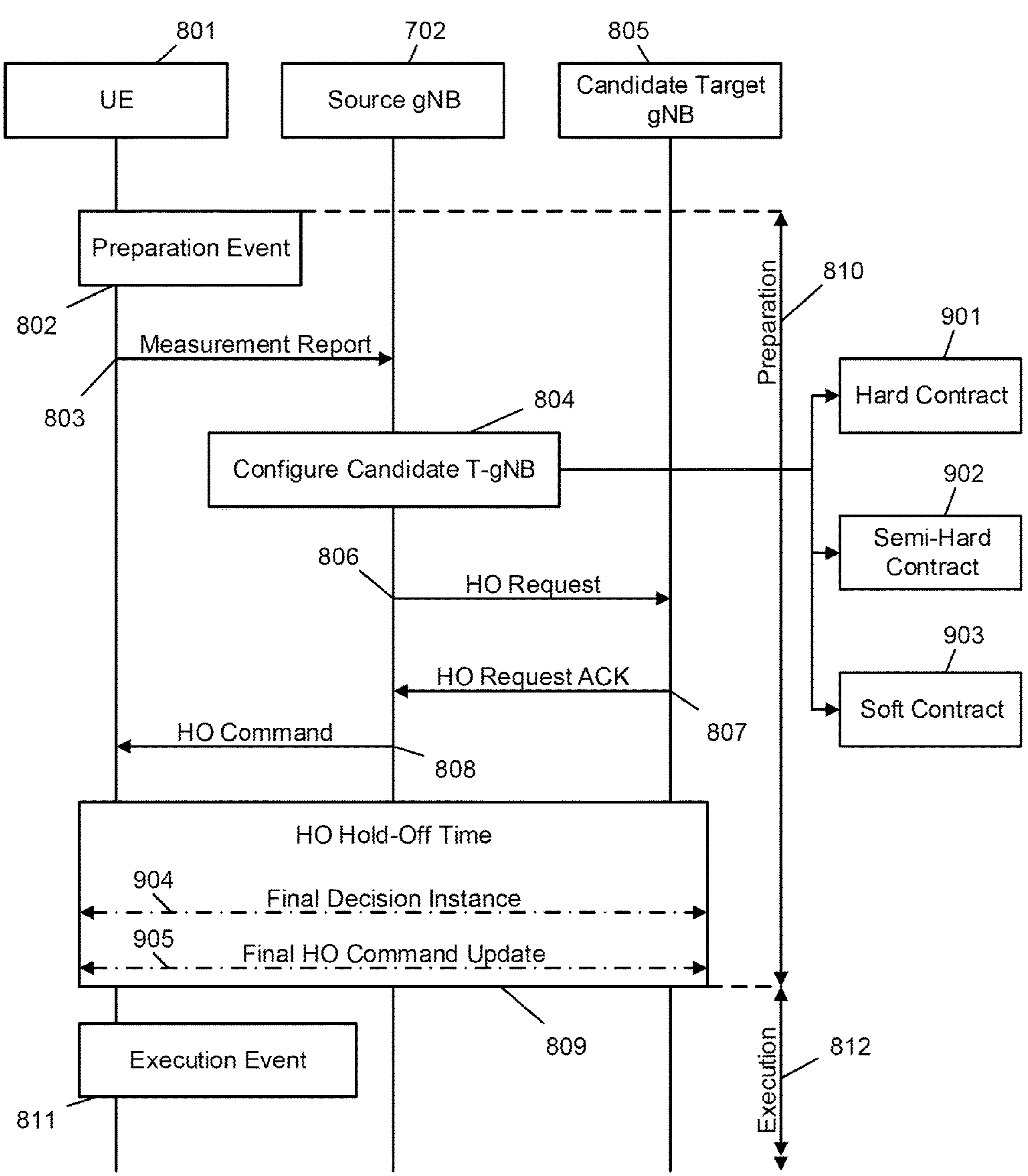
FIG. 9 shows a procedure for proactive conditional handover, according to an embodiment of the present disclosure.

FIG. 9 shows a procedure, according to methods of the present disclosure, for handling the potential HO events of FIG. 7. The procedure here may follow the actions of FIG. 8 until the s-gNB 702 configures 804 the one or more candidate t-gNBs 805. When configuring 804 the t-gNBs 805, the s-gNB 702 may implement TC 301, GCG 305, and ICG 307 modules to classify the t-gNBs 805, and itself, and generate individualized contracts 308. Each t-gNB 805 and the s-gNB 702 may be classified according to a priority level that depends on a probability of a respective HO or service commitment occurring. For example, with the four options available to the first car 701 in FIG. 7, there may be a 70% probability of a HO to t-gNB 710, a 25% probability of the UE 801 staying with the s-gNB 702, a 2.5% probability of a HO to t-gNB 711, and a 2.5% probability of a HO to t-gNB 707. Consequently, t-gNB 710 may be classified as high priority, s-gNB 702 as medium priority, and t-gNBs 707 and 711 as low priority. The probabilities may be, for example, based on the operational history of the UE 801 and may be determined as part of the measurements compiled in the measurement report 803. Examples of terms that may be included in the individualized contracts 308 for the HO procedure are provided in Table 1, below. Each term may have conditions, such as a time window or approval requirement, that can be customized for each class and each t-gNB 805. In addition, each term may be hard or soft, with soft terms being negotiable and hard terms being non-negotiable. In configuring 804 the t-gNBs 805, each resulting individualized contract 308 may be either a hard contract 901, a semi-hard contract 902, or a soft contract 903. Table 2, below, shows examples of negotiable contract terms and their conditions for semi-hard contracts 902 that have been generated for each class of t-gNB 805. Each contract in Table 2 may have additional terms that are non-negotiable.

TABLE 1

Examples of general contract terms for the HO procedure of FIG. 9.

| Contract Term | Clause |
|---|---|
| T1 | Max hold-off time: the time that a t-gNB needs to wait before releasing committed resources or removing itself from the list of candidate t-gNBs |

TABLE 1-continued

Examples of general contract terms for the HO procedure of FIG. 9.

| Contract Term | Clause |
|---|---|
| T2 | Time until final commitment decision: the time allowed to a t-gNB before it needs to respond with a final commitment decision to a HO request from the s-gNB |
| T3 | Resource release policy after final decision: the conditions upon which a t-gNB is allowed to release committed resources |
| T4 | Acceptance of other users during HO hold-off time: a condition for whether a t-gNB can provide service and assign resources to additional UEs while in the HO hold-off period |
| T5 | Requirement of s-gNB approval: a condition for whether the t-gNB requires s-gNB approval before releasing resources |
| T6 | Negotiability: a condition for whether terms of the contract are negotiable |
| T7 | Prediction update frequency: the frequency by which the s-gNB will update the t-gNB on the status of the UE |

TABLE 2

Examples of negotiable contract terms for the t-gNBs of FIG. 9.

| | | Contract Terms | | | |
|---|---|---|---|---|---|
| Class | gNBs | T1 | T2 | T3 | T4 |
| 1 (High Priority) | 710 | Until execution event (fixed) unless otherwise indicated | | | |
| 2 (Medium Priority) | 702 | Until execution event (fixed) unless otherwise indicated | 0.5 sec | Requires s-gNB approval | No |
| 3 (Low Priority) | 707, 711 | Until execution event (fixed) unless otherwise indicated | 1 sec | Does not require s-gNB approval | |

After configuring 804 the candidate t-gNBs 805, the s-gNB 702 may send the individualized contracts 308 to the t-gNBs 805 as part of the HO request 806 messages. Contract negotiation and agreement may then be done until a final decision 904 is needed, which may be during the HO hold-off period 809 and specified by term T2 of Table 1. During contract negotiation, data collection through measurements may continue, which may cause the probabilities of the different HO events to evolve. For example, the probability for a HO to t-gNB 710 may start at 70%, decrease to 65% at a second point in time, and increase to 85% at a third point in time. These changes may subsequently cause some contracts or terms thereof to harden and the list of t-gNBs 805 to change. For example, the contracts may have a condition to harden when the probability for the corresponding execution event exceeds 80%; such a condition would cause the contract for t-gNB 710 to harden at the third point in time. Table 3, below, shows example changes in the contract terms for gNBs 710 and 711 at two time points, $t_1$ and $t_2$. Changes in the contracts and t-gNBs 805 may be relayed to the UE 801 by HO command messages 808. At the final decision 904 instance, the s-gNB 702 may demand decisions from the t-gNBs 805 on whether they agree to their respective contracts. From there and until the execution event 811, the t-gNBs 805 may operate proactively in anticipation of the execution event 811. During this time, the UE 801 may receive a final HO command update 905.

TABLE 3

Example of contract evolution for two gNBs of FIG. 7 across two points in time.

| Contract Term | Time | gNB 710 | gNB 711 |
|---|---|---|---|
| T1 | $t_1$ | Until execution event (fixed) unless otherwise indicated | Can be negotiated |
| | $t_2$ | Until execution event (fixed) unless otherwise indicated | Can be negotiated |
| T2 | $t_1$ | 1 sec | 3 sec |
| | $t_2$ | Remaining time of the 1 sec | 1 sec starting now |
| T3 | $t_1$ | Requires s-gNB approval | No approval needed |
| | $t_2$ | Requires s-gNB approval | No approval needed for the next 0.5 sec, after which approval from s-gNB is required |

Figure 10A:
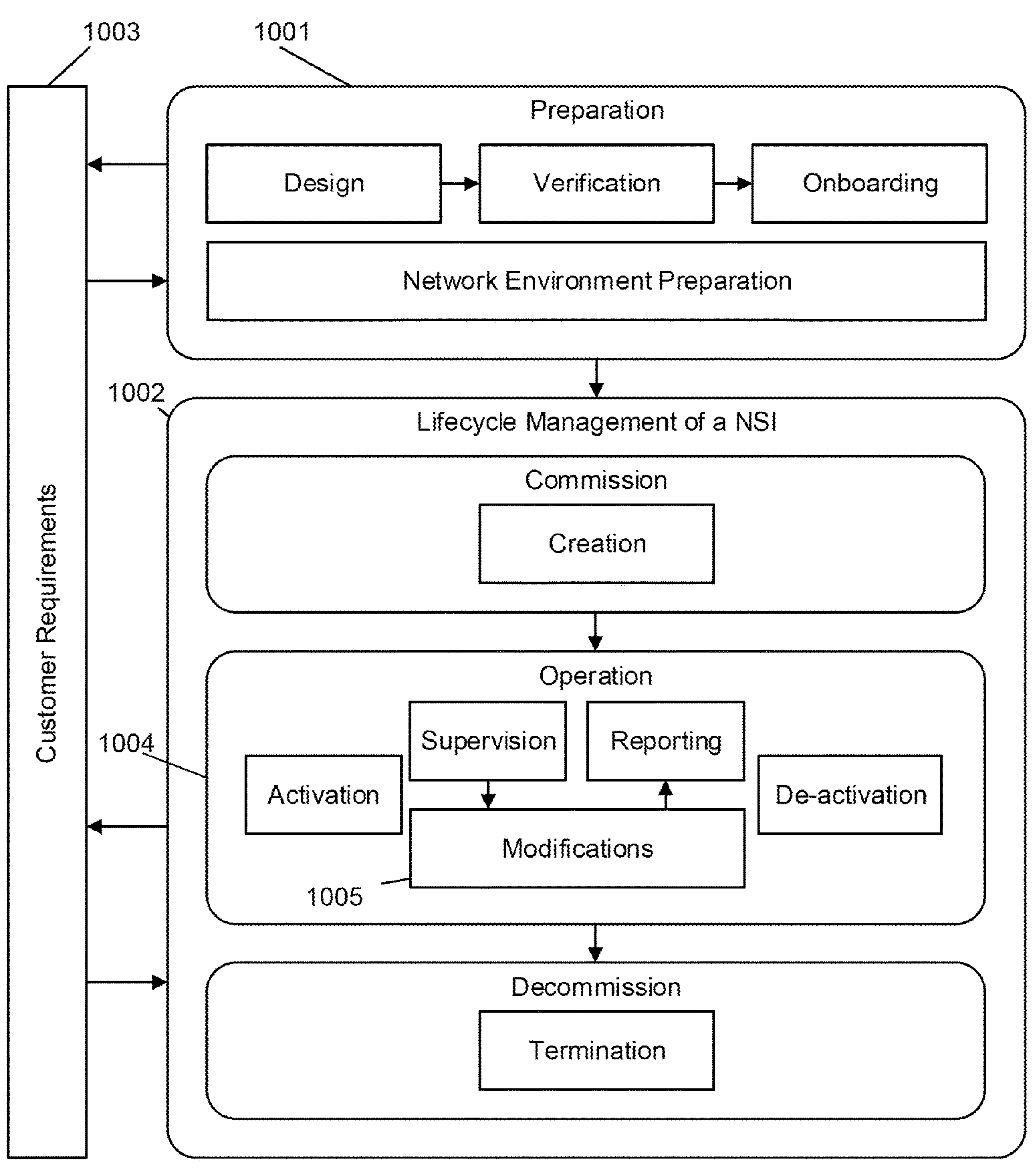
FIG. 10A shows preparation and lifecycle management processes for network slice instances, according to methods typical of the prior art.

FIG. 10A shows processes for the preparation 1001 and management 1002 of network slice instances (NSIs), according to methods of the prior art. The NSIs may be partitions (slices) of a communication network that share a common physical network. The processes of FIG. 10 may be used to dynamically modify NSIs to suit customer requirements 1003. Within the management processes 1002, there may be an operation phase 1004 in which mechanisms that calculate resource usage based on provisioning to NSIs and performance monitoring may be used to generate modification policies. The modifications, which may be determined at a modifications node 1005, belonging to these policies can involve resource reservation, which may cause undesirable performance drops when done reactively. Embodiments of the present disclosure may be implemented in the processes of the operation phase 1004 to introduce proactive operation such that resources may be reserved proactively and with flexibility.

Figure 10B:
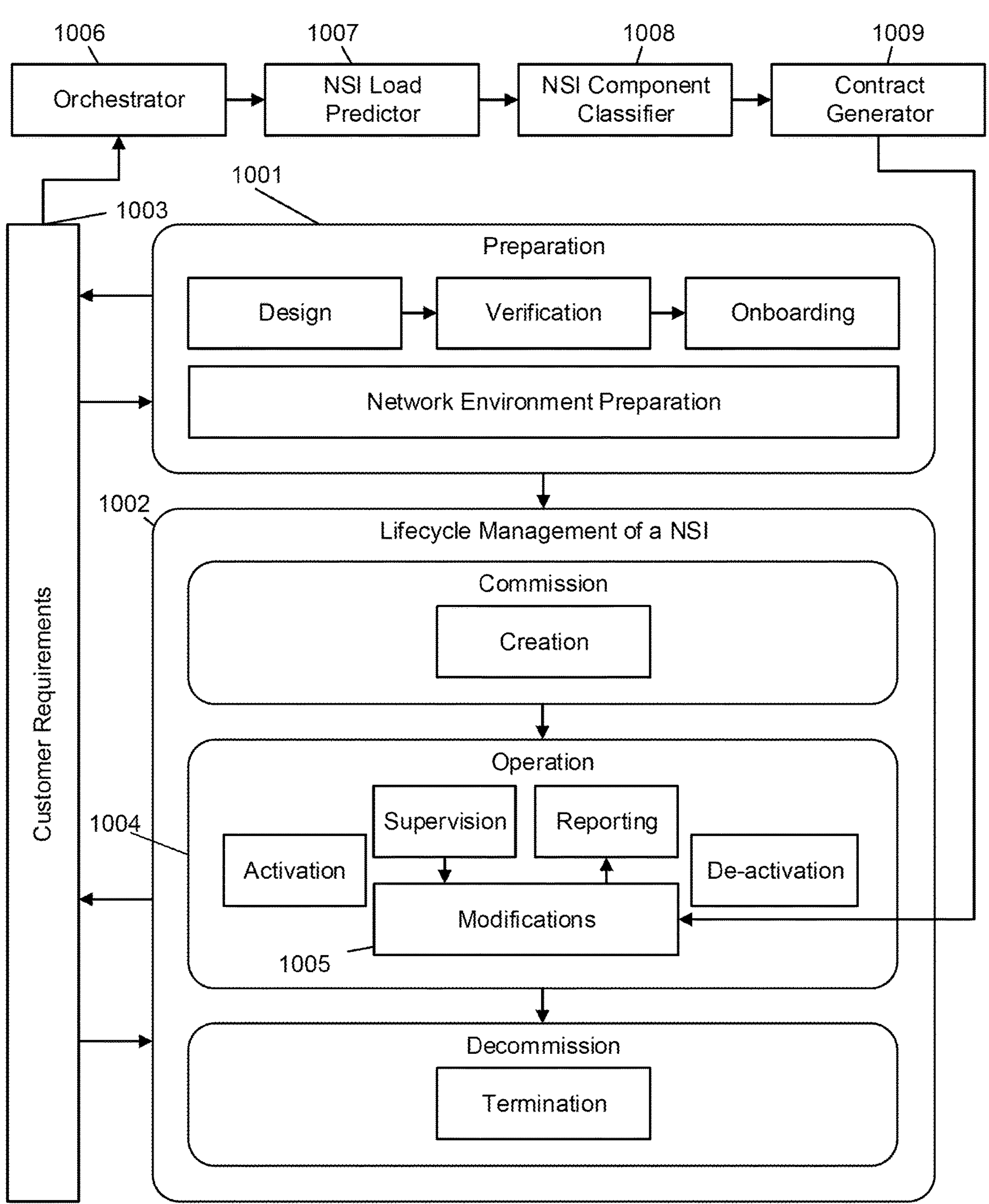
FIG. 10B shows preparation and lifecycle management processes for network slice instances, according to an embodiment of the present disclosure.

FIG. 10B shows processes for the preparation 1001 and management 1002 of NSIs according to an embodiment of the present disclosure. The processes of FIG. 10B may involve an NSI orchestrator 1006, which may be a centralized NE serving as a master NE 101. The NSI orchestrator 1006 may access data flows that carry the customer requirements 1003, which may become the basis for modifying NSIs. The NSI orchestrator 1006 may monitor the customer requirements 1003 for a predefined period of time and collect information necessary for making predictions on the traffic loads of NSIs. The NSI orchestrator 1006 may then forward the collected data to an NSI load predictor 1007, which may make a prediction of potential future loading conditions corresponding to a foreseeable event. The prediction may indicate a need for modifying an NSI, which may entail redistributing underlying resources across multiple NSIs. Predictions made at the NSI load predictor 1007 may be sent to an NSI component classifier 1008, which may classify the NEs of the physical network common to each NSI. Classification may be done according to predetermined criteria, which, for example, may include each NE's location, relevance to the predictions, resource availability, and predicted loading conditions. The classes of NEs may be shared with a contract generator 1009, which may generate general contracts and send them to the modifications node 1005 for customization towards individualized contracts 308. The individualized contracts 308 may be distributed to each respective NE of the physical network. The NSI orchestrator 1006 may continue to monitor customer requirements 1003 and may initiate a new prediction at the NSI load predictor 1007 if the collected data indicates that one is needed. Contract generation, classification, modification, and distribution may follow as described previously. The processes described in relation to FIG. 10B may proceed or iterate until only a predetermined time remains before the expected event. Until this time, the individualized contracts 308 may further harden or soften according to hardening conditions, such as a prediction probability being met or a hardening request being sent from the NSI orchestrator 1006.

Figure 11:
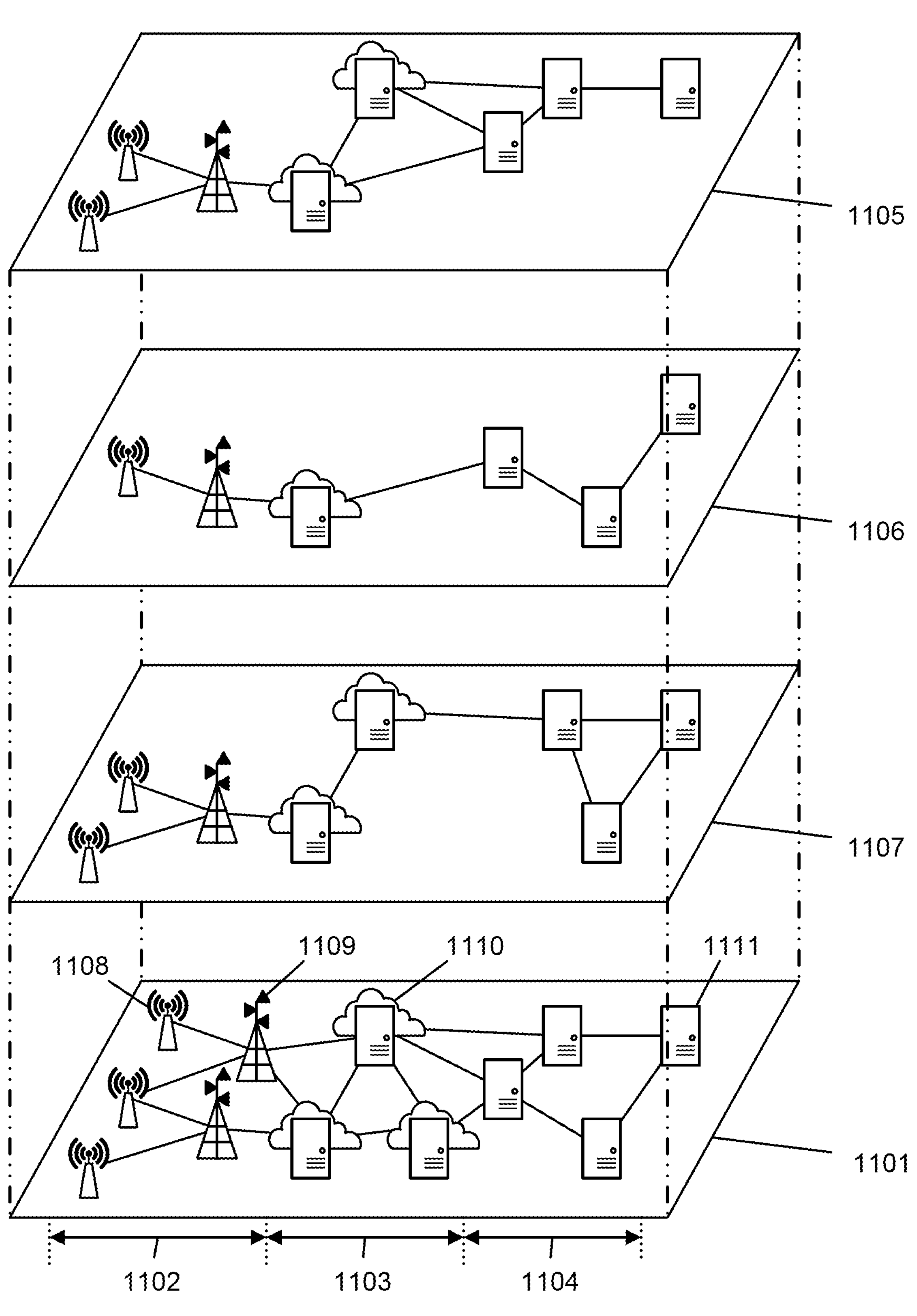
FIG. 11 shows a typical scenario for network slice instances, where embodiments of the present disclosure may be implemented.

FIG. 11 shows a non-limiting example of three NSIs for which proactive resource management according to embodiments of the present disclosure may be implemented. The three NSIs share a physical network 1101 of end-to-end infrastructure (network resources), including a radio access layer 1102, an edge server layer 1103, and a core network layer 1104. The three NSIs correspond to three network applications, namely enhanced mobile broadband (eMBB) 1105, ultrareliable and low latency communication (URLLC) 1106, and massive machine-type communication (mMTC) 1107. The radio access layer 1102 may, for example, comprise NEs such as local radio access points 1108 and radio base stations 1109. The edge server layer 1103 may, for example, comprise NEs such as edge cloud servers 1110. The core network layer 1104 may, for example, comprise NEs such as core network servers 1111. The physical network 1101 may comprise additional NEs and/or layers. In the example of FIG. 11, the role of a master NE 101 may be served by a NSI orchestrator 1006, which may be a centralized NE that may collect information on the traffic conditions of each NSI and make predictions about the future traffic conditions of each NSI. The master NE 101 may further be any NE belonging to the radio access layer 1102, the edge server layer 1103, or the core network layer 1104. In some instances, the master NE 101 may be any other NE in the physical network 1101. Initially, each NSI may have resources from the physical network 1101 that are sufficient to support current traffic loads. However, the NSI orchestrator 1006, having collected information on the traffic conditions of each NSI, may predict changes in the traffic conditions that may necessitate changes to the resources assigned to each NSI. Such predictions may be made periodically according to a predetermined schedule, upon a request from an NSI, or in response to another trigger event. Table 4, below, shows examples of predictions for changes in the traffic loads for each NSI made at two time points, $t_1$ and $t_2$, relative to current traffic loads and in relation to a future event time, $t_e$. At $t_1$ the mMTC NSI 1107 is predicted to have a 60% increase in demand by $t_e$. This increase is above the loads that can be supported by the resources currently available to the mMTC NSI 1107. Thus, more resources would need to be assigned to mMTC NSI 1107 to meet this increase in demand. Meanwhile, at $t_1$, the eMBB NSI 1105 is predicted to have a 80% decrease in demand by $t_e$ and the URLLC NSI 1106 is predicted to have a 20% decrease in demand by $t_e$.

TABLE 4

Percent change in traffic loads for the NSIs of FIG. 11, predicted at times $t_1$ and $t_2$.

| NSI | Change in traffic load t1 | t2 |
|---|---|---|
| eMBB 1105 | −80% | −50% |
| URLLC 1106 | −20% | −60% |
| mMTC 1107 | +60% | +60% |

To meet the predicted changes of Table 4, the NSI orchestrator 1006 may implement methods of the present disclosure to proactively redistribute or assign network resources across the NSIs of FIG. 11. In response to the predictions made at $t_1$, the NSI orchestrator 1006 may use TC 301, GCG 305, and ICG 307 modules to, in accordance with the predicted changes, classify the network resources of the physical network 1101, which may be considered target NEs 102, and generate individualized contracts 308 therefor. The individualized contracts 308 may have terms that harden when only a specified period of time Δt remains before $t_e$. These hardening conditions contrast with the example discussed in relation to FIG. 9, wherein the terms may harden when a particular probability of the event occurring is reached. The time period Δt may be predetermined and adjustable. The contracts may be updated until Δt remains before $t_e$ but, in this case, may not be negotiated with the NSI orchestrator 1006. For example, at time $t_2$, which may follow $t_1$ but precede $t_e$, the prediction for the eMBB NSI 1105 may be updated to a decrease of 50% and the prediction for the URLLC NSI 1106 may be updated to a decrease of 60%. These updates may be based on additional data collected by the NSI orchestrator 1006 and may cause the individualized contracts 308 to be modified.

Embodiments of the present disclosure may be implemented using electronics hardware, software, or a combination thereof. Some embodiments may be implemented by one or multiple computer processors executing program instructions stored in memory. Some embodiments may be implemented partially or fully in hardware, for example, using one or more field programmable gate arrays (FPGAs) or application specific integrated circuits (ASICs) to rapidly perform processing operations.

Figure 12:
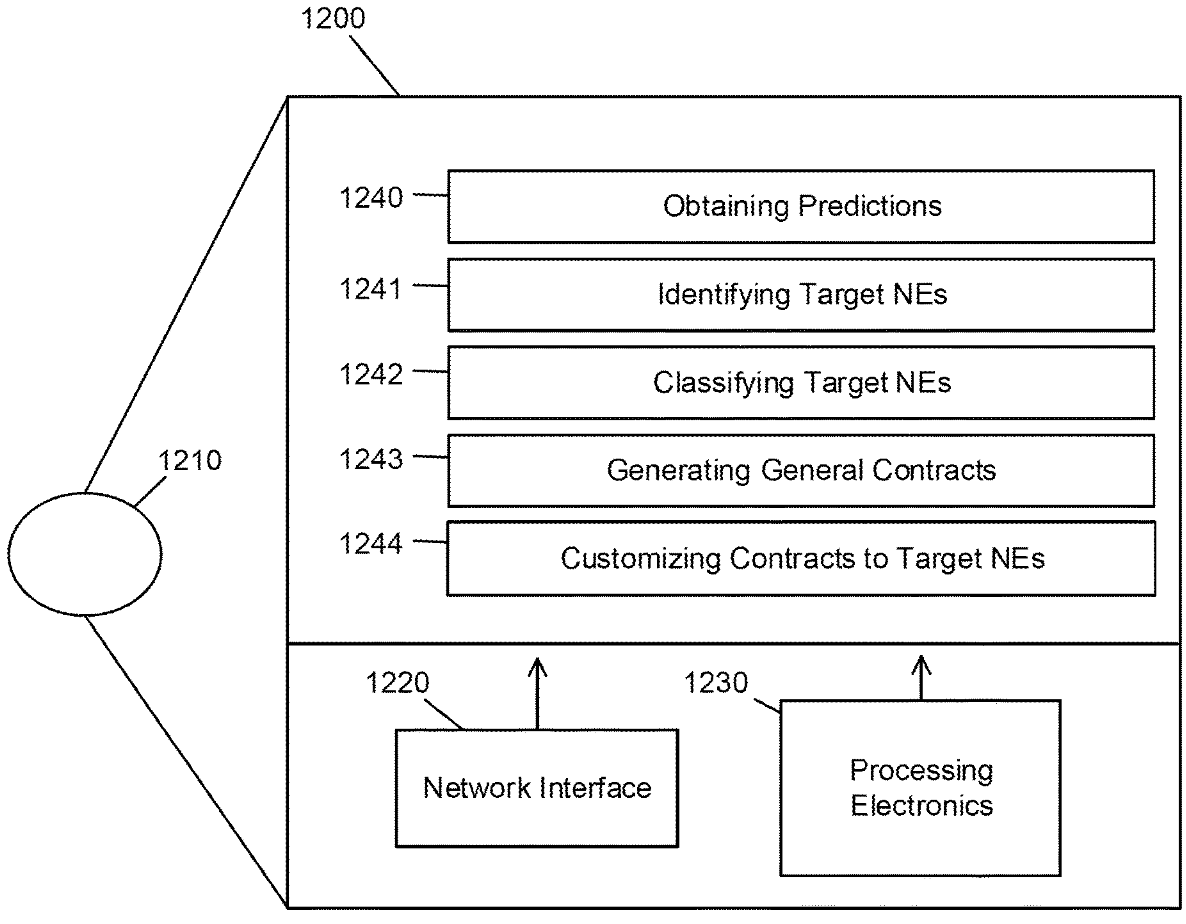
FIG. 12 shows an apparatus for implementing proactive network operation, according to embodiments of the present disclosure.

FIG. 12 shows an apparatus 1200 for implementing, at least partly, methods for integrating proactivity in communication networks with target contracts, according to embodiments of the present disclosure. The apparatus may be located at a node 1210 of the communication network. The apparatus may include a network interface 1220 and processing electronics 1230. The processing electronics may include a computer processor executing program instructions stored in memory, or other electronics components such as digital circuitry, including, for example, FPGAs and ASICs. The network interface 1220 may include an optical communication interface or radio communication interface, such as a transmitter and receiver. The apparatus 1200 may include several functional components, each of which is partially or fully implemented using the underlying network interface 1220 and processing electronics 1230. Examples of functional components may include modules for obtaining 1240 predictions, identifying 1241 target NEs, classifying 1242 target NEs, generating 1243 general contracts, and customizing 1244 contracts to target NEs.

Figure 13:
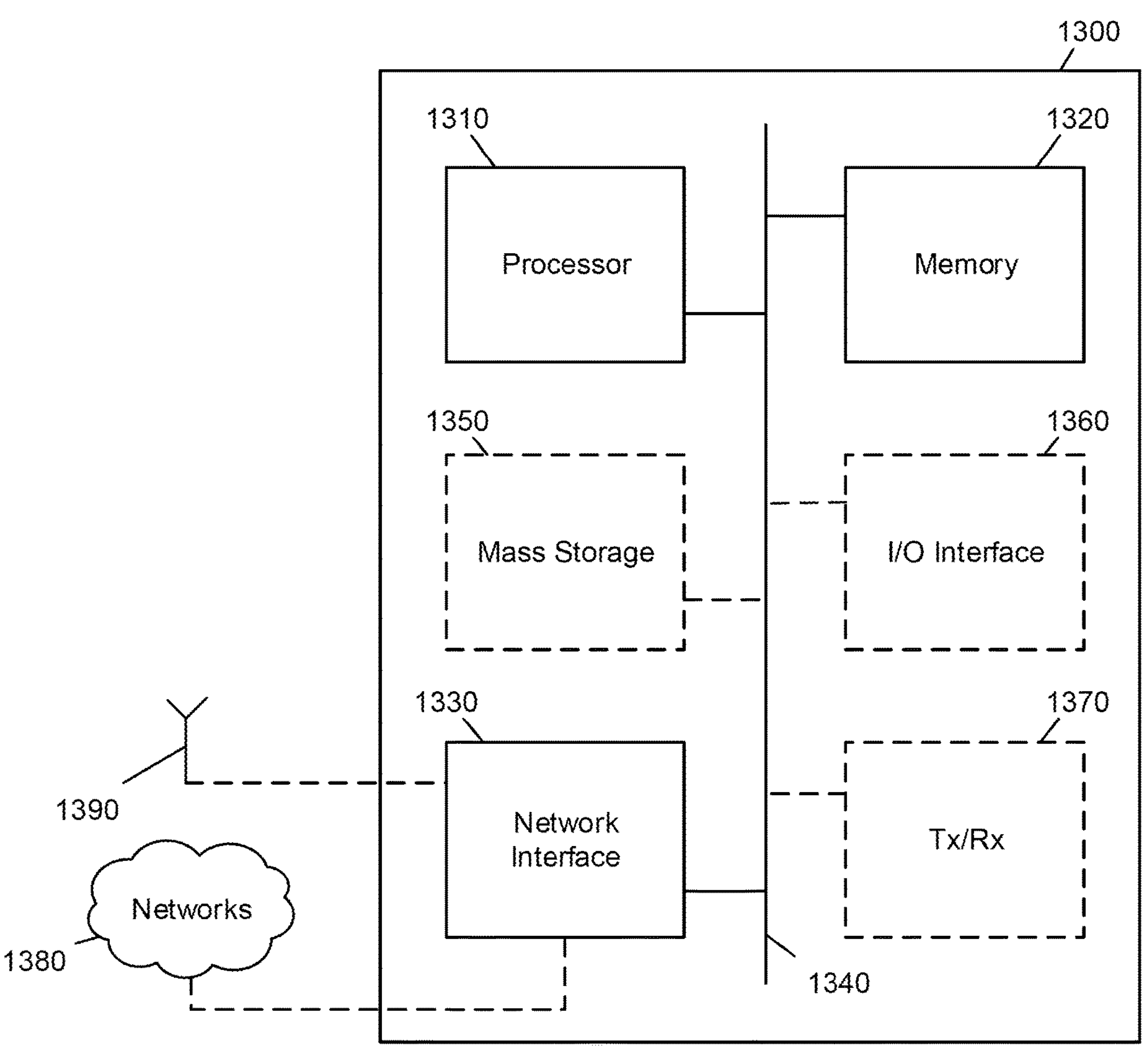
FIG. 13 shows a schematic of an embodiment of an electronic device that may implement all or part of the methods and features of the present disclosure.

FIG. 13 shows a schematic diagram of an electronic device 1300 that may perform any or all of the operations of the above methods and features explicitly or implicitly described herein, according to different embodiments of the present disclosure. For example, a computer equipped with network functions may be configured as electronic device 1300. The electronic device 1300 may be used as part of an NE, master NE 101, target NE 102, or orchestrator, for example.

As shown, the device includes a processor 1310, such as a Central Processing Unit (CPU) or specialized processors such as a Graphics Processing Unit (GPU) or other such processor unit, memory 1320, network interface 1330, and a bi-directional bus 1340 to communicatively couple the components of electronic device 1310. Electronic device 1300 may also optionally include non-transitory mass storage 1350, an I/O interface 1360, and a transceiver 1370. According to certain embodiments, any or all of the depicted elements may be utilized, or only a subset of the elements. Furthermore, the device 1300 may contain multiple instances of certain elements, such as multiple processors, memories, or transceivers. In addition, elements of the hardware device may be directly coupled to other elements without the bi-directional bus. Additionally or alternatively to a processor and memory, other electronics, such as integrated circuits, may be employed for performing the required logical operations.

The memory 1320 may include any type of non-transitory memory such as static random access memory (SRAM), dynamic random access memory (DRAM), synchronous DRAM (SDRAM), read-only memory (ROM), any combination of such, or the like. The mass storage element 1350 may include any type of non-transitory storage device, such as a solid state drive, hard disk drive, a magnetic disk drive, an optical disk drive, USB drive, or any computer program product configured to store data and machine executable program code. According to certain embodiments, the memory 1320 or mass storage 1350 may have recorded thereon statements and instructions executable by the processor 1310 for performing any of the aforementioned method operations described above. In the embodiment of FIG. 13, mass storage 1350 is distinct from memory 1320 and may generally perform storage tasks compatible with higher latency but may generally provide lesser or no volatility. In some embodiments, mass storage 1350 may be integrated with the memory 1320.

Network interface 1330 may include at least one of a wired network interface and a wireless network interface. The network interface 1330 may include a wired network interface to connect to a communication network 1380 and may also include a radio access network interface 1390 for connecting to the communication network 1380 or other network elements over a radio link. The network interface 1330 enables the electronic device 1300 to communicate with remote entities such as those connected to the communication network 1380.

The bi-directional bus 1340 may be one or more of any type of several bus architectures, including a memory bus or memory controller, a peripheral bus, or a video bus.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the methods described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Embodiments of the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

The word “a” or “an” when used in conjunction with the term “comprising” or “including” in the claims and/or the specification may mean “one”, but it is also consistent with the meaning of “one or more”, “at least one”, and “one or more than one” unless the content clearly dictates otherwise. Similarly, the word “another” may mean at least a second or more unless the content clearly dictates otherwise.

The terms “coupled”, “coupling” or “connected” as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term “and/or” herein when used in association with a list of items means any one or more of the items comprising that list.

Although a combination of features is shown in the illustrated embodiments, not all of them need to be combined to realize the benefits of various embodiments of this disclosure. In other words, a system or method designed according to an embodiment of this disclosure will not necessarily include all features shown in any one of the Figures or all portions schematically shown in the Figures. Moreover, selected features of one example embodiment may be combined with selected features of other example embodiments.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for proactive operation in a network, the network including one or more network entities (NEs), one of the one or more NEs being an orchestrator, the method comprising, by the orchestrator:

obtaining an initial prediction of a potential state of the network;

obtaining one or more additional initial predictions for at least one additional potential state of the network, each of the at least one additional potential state being an alternative to the potential state;

identifying one or more target NEs of the one or more NEs;

generating one or more contracts, each contract having a respective one or more terms, each term defining a respective network action by a respective at least one target NE to prepare the network for the potential state or for one of the at least one additional potential states, wherein each at least one target NE belongs to the one or more target NEs;

executing at least one contract of the one or more contracts; and causing, when the at least one contract is executed, the respective network action of each term of the at least one contract to begin executing by the respective at least one target NE, and a respective one or more network resources of each at least one target NE of the at least one contract to become reserved for the potential state or for the one additional potential state.

2. The method of claim 1, further comprising, by the orchestrator:

categorizing each of the one or more target NEs into a class of one or more classes.

3. The method of claim 2, wherein categorizing each of the one or more target NEs into the class of the one or more classes includes using a target classifier function.

4. The method of claim 2, wherein each class corresponds to a priority level.

5. The method of claim 2, wherein generating the one or more contracts includes:

generating for each class a general contract; and individualizing each general contract according to the target NEs of the corresponding class.

6. The method of claim 5, wherein generating for each class the general contract includes retrieving one or more terms from a pool of terms.

7. The method of claim 5, wherein generating for each class the general contract includes using a general contract generator function.

8. The method of claim 5, wherein individualizing each general contract according to the target NEs of the corresponding class includes using an individualized contract generator function.

9. The method of claim 1, further comprising, by the orchestrator:

detecting a trigger event in the network, wherein the trigger event is a change in a network parameter that meets a threshold value.

10. The method of claim 9, wherein obtaining the initial prediction of the potential state of the network is done when the trigger event is detected.

11. The method of claim 1, further comprising, by the orchestrator:

sending each contract to each target NE of the respective at least one target NE of each term of the respective contract.

12. The method of claim 11, wherein one term of each of the one or more contracts defines a respective hardening condition for finalizing the respective contract.

13. The method of claim 12, wherein each hardening condition depends from a probability of the potential state or a time duration.

14. The method of claim 12, further comprising, by the orchestrator:

receiving from each target NE of the respective at least one target NE of each term of the at least one contract an agreement to the at least one contract.

15. The method of claim 11, further comprising, by the orchestrator:

obtaining a second prediction of the potential state, the second prediction obtained after the initial prediction.

16. The method of claim 15, further comprising, by the orchestrator:

sending to at least one target NE the second prediction.

17. A communication network comprising one or more network entities (NEs), at least one of the one or more NEs being an orchestrator configured to implement the method of claim 1.

18. A method for proactive operation in a network, the network including one or more network entities (NEs), one of the one or more NEs being an orchestrator, the method comprising, by the orchestrator:

obtaining an initial prediction of a potential state of the network;

identifying one or more target NEs of the one or more NEs;

categorizing each of the one or more target NEs into a class of one or more classes;

generating one or more contracts, each contract having a respective one or more terms, each term defining a respective network action by a respective at least one target NE to prepare the network for the potential state, wherein each at least one target NE belongs to the one or more target NEs;

sending to a set of the one or more target NEs each a template hard contract defining a respective one or more template hard contract terms, each template hard contract term defining a respective network action by a respective at least one target NE among the one or more target NEs for immediate execution;

executing at least one contract of the one or more contracts; and causing, when the at least one contract is executed, the respective network action of each term of the at least one contract to begin executing by the respective at least one target NE, and a respective one or more network resources of each at least one target NE of the at least one contract to become reserved for the potential state or for the one additional potential state.

19. The method of claim 18 further comprising, by the orchestrator:

detecting a trigger event in the network, wherein the trigger event is being a change in a network parameter that meets a threshold value.

20. The method of claim 18 further comprising, by the orchestrator:

sending each contract to each target NE of the respective at least one target NE of each term of the respective contract.

* * * * *